(12) United States Patent
Rohani et al.

(10) Patent No.: US 8,364,102 B2
(45) Date of Patent: Jan. 29, 2013

(54) UNIVERSAL FRONT END MODULE FOR NETWORKING DEVICE

(75) Inventors: Nader Rohani, Scottsdale, AZ (US); Hongtao Xu, Hillsboro, OR (US); Yulin Tan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1418 days.

(21) Appl. No.: 11/788,073

(22) Filed: Apr. 19, 2007

(65) Prior Publication Data

US 2008/0261540 A1  Oct. 23, 2008

(51) Int. Cl.
*H01Q 11/12* (2006.01)
*H04B 1/04* (2006.01)

(52) U.S. Cl. ............... 455/121; 455/552.1; 455/142

(58) Field of Classification Search ............ 455/552.1, 455/93, 102, 115.1–115.4, 120, 124, 125, 455/126, 127.1–127.5, 142, 144, 188.1–188.2, 455/230
See application file for complete search history.

(56) References Cited

U.S. PATENT DOCUMENTS

| | | | | |
|---|---|---|---|---|
| 7,369,096 B2 * | 5/2008 | Castaneda et al. | ............ | 343/859 |
| 7,376,116 B2 * | 5/2008 | Rozenblit et al. | ............ | 370/342 |
| 2004/0224649 A1 * | 11/2004 | Shamsaifar | ............ | 455/107 |
| 2006/0046773 A1 * | 3/2006 | Aycin et al. | ............ | 455/552.1 |
| 2006/0281488 A1 * | 12/2006 | Chang et al. | ............ | 455/553.1 |
| 2008/0026709 A1 * | 1/2008 | Liu et al. | ............ | 455/121 |

* cited by examiner

*Primary Examiner* — Christian Hannon
(74) *Attorney, Agent, or Firm* — Thorpe North & Western, LLP

(57) ABSTRACT

In one embodiment a universal front end module for network communications is disclosed. The module can include a mode controller coupled to components of a transmission path. A first tunable filter on a transmit path can receive a mode control signal from the mode controller and receive a signal to be transmitted and provide a filtered output signal responsive to the mode control signal and the signal to be transmitted. The mode control signal can be associated with a predetermined network protocol such as WiMax, a WiFi, a 3G LTE and a cellular standard where each standard has a predetermined operating frequency and protocol. The module can also include a tunable power amplifier to provide an amplified transmittable signal over a single transmit path can be utilized to transmit the transmittable signal in at least two different modes responsive to the mode controller.

14 Claims, 2 Drawing Sheets

UNIVERSAL FRONT END MODULE FOR NETWORKING DEVICE

FIELD OF DISCLOSURE

The present disclosure is related to the field of electronics and more particularly to the field of wireless communication among network devices.

BRIEF DESCRIPTION OF THE DRAWINGS

Aspects of the disclosure will become apparent upon reading the following detailed description and upon reference to the accompanying drawings in which, like references may indicate similar elements.

DETAILED DESCRIPTION OF EMBODIMENTS

Figure 1:
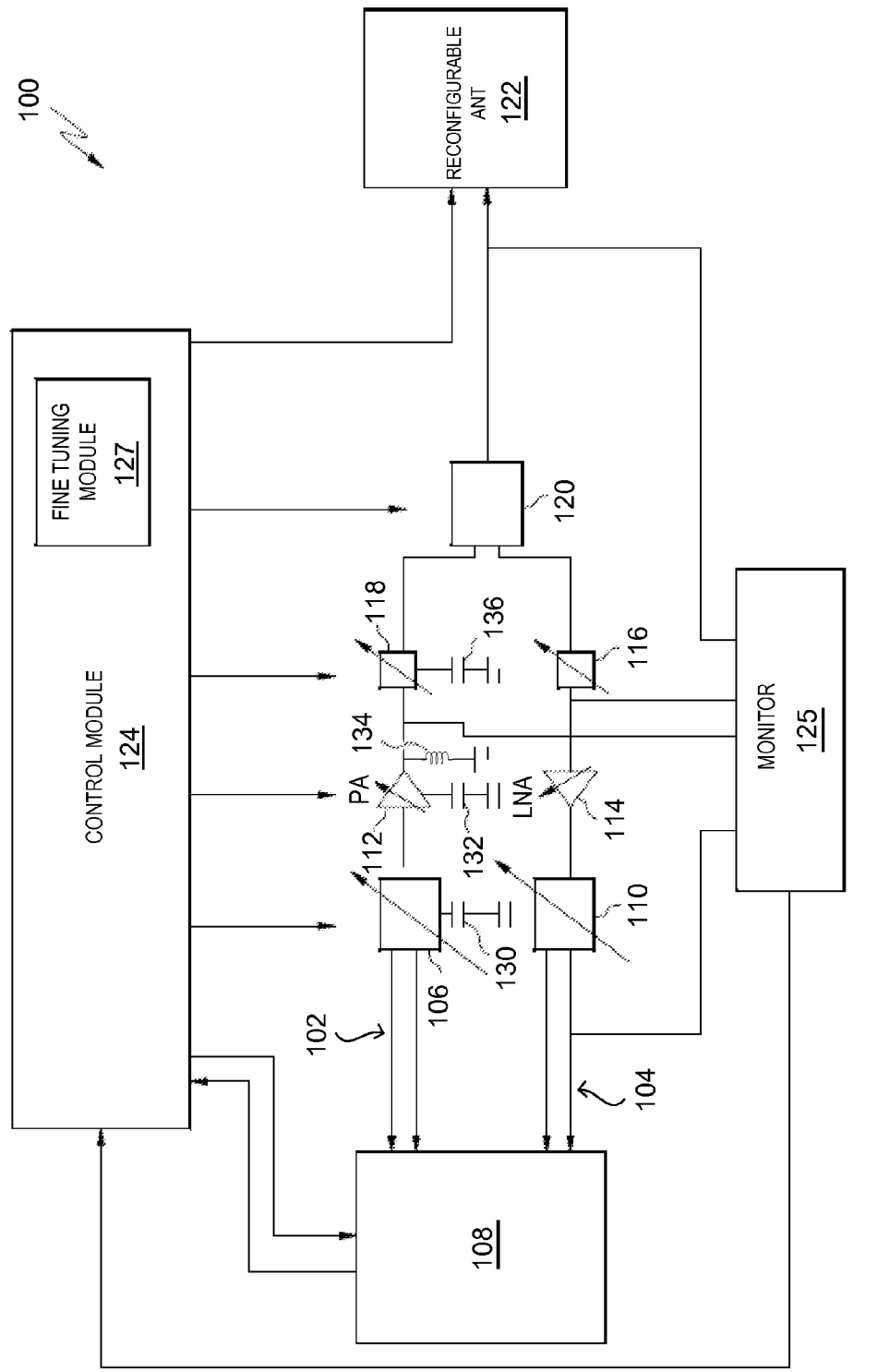
FIG. 1 depicts a block diagram of a universal front end module.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

While specific embodiments will be described below with reference to particular configurations of hardware and/or software, those of skill in the art will realize that embodiments of the present disclosure may advantageously be implemented with other equivalent hardware and/or software systems. Aspects of the disclosure described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the disclosure are also encompassed within the scope of the disclosure.

In recent years, wireless communication hardware has been integrated with computing devices such as personal computers such that wireless network communication capability is built in to these personal computers. Accordingly, many wireless standards and protocols have evolved for wireless networking where each standard has its strong points and weak points. In addition, the popularity of wireless environments has created highly congested airways. For example, some available personal computers have wireless platforms that support multiple wireless standards. For example, a platform may support the institute of electrical and electronic engineers (IEEE) 802.11a and b standard, published 1999, IEEE 802.11.e (WiFi) standard published 2005, and IEEE 802.16 (WiMax) standard published 2001. Other wireless standards that could be useful to personal computers include third generation (3G) long term evolution LTE cellular systems (specification currently in process) global positioning systems and Bluetooth published 2004 and mobile digital television.

With all of these standards, newer devices are moving away from a monolithic wireless standard environment to support multiple wireless standards environments. However creating an economical system that can communicate in multiple formats can pose significant engineering challenges both in product design and development. One challenge is minimizing the cost of multiple radio frequency (RF) paths traditionally required to accommodate the different transmit and receive frequencies of the multiple standards. Development of such co-existing multiple paths adds significantly to the total cost of a product due to the materials required, the space required, the switching required, the research and development time, time to market costs, and production and testing cost for such "redundancy" to name a few. In addition, the power consumption, the size or form factor of the wireless system in a mobile device having all of these RF paths can become very uneconomical because of the limited space and power reserve on such a portable device.

Another issue is the complexity of a design or system that will support multiple wireless standards in a congested spectrum. More specifically, the ability to transmit and receive on multiple frequencies with multiple protocols and the ability to accommodate the many different idiosyncrasies of the current standards present serious technological challenges particularly for the radio frequency (RF) front end portion of the device. The front end portion of the device is generally defined as the input and output stages of the transceiver. In the front end, signals with very small power levels for example, below −100 dBm, compete for reception in the presence of strong interferences of up to 30 dBm that are present within the band of operation. Cordless phones, ultra wide band systems and other short range communication devices often utilize the same frequencies and can create significant interference to the RF front end.

In accordance with the present disclosure, RF front end designs that can efficiently accommodate many different frequencies and standards utilized by local area networks are disclosed. Referring to FIG. 1, a block level diagram of a universal front end module 100 is disclosed. In one embodiment, the module 100 can support WiFi frequencies at 2.4 and 5.5 GHz and Wimax frequencies at 2.4 and 3.5 GHz. In one embodiment, the module 100 can operate in accordance with other wireless standards specifically those having operating frequencies from 200 MHz to 7 GHz.

As stated above, traditional wireless platforms utilize a transmit and receive RF path for each standard or frequency, and thus typically have two conductive paths for each standard they can accommodate. In accordance with the present disclosure, a single transmit and receive path 104 and 102 can be utilized to support multiple standards. The transmit path 104 can include a tunable band pass filter/balun 106. The balun 106 can take differential data provided by the base band module 108 and convert the differential data into single ended data for amplification by the tunable power amplifier (PA) 112. The word balun is derived from converting a "BALanced" data line to an "Unbalanced" data line. Thus, the balun can change the communication structure from one format to another format. The single ended or non-differential data lines can be sent to the tunable PA 112.

The tunable PA 112 can be adjustable or tunable to the appropriate operating frequency (different modes) and to a suitable compression point such as a 1 decible compression point (P1db) via control signals from the control module 125. P1db is a figure-of-merit for output power where a higher compression point relates to higher output power. P1db is at an input (or output) power such that the gain is lowered by one dB when compared to the gain at very low power.

In one embodiment the module 100 can tune the transmission path and active components of the path such as tunable PA 112 to operate efficiently at predetermined operating frequencies or at frequencies within a specific band. For example, the module 100 may switch in tuning components coupled to the transmission path 104 such that the system is very efficient at transmitting on frequencies between 2.4GHz and 5.2GHz regardless of the modulating scheme utilized at the selected frequency. The power efficiency of the tunable PA 112, can be defined by a power added efficiency (PAE). The PAE is a useful measurement when analyzing battery operated devices because the tunable PA 112 can be biggest power consuming component in a transmit/receive paths (104 and 102) of a wireless system.

During operation, the output of the tunable PA 112 can be fed to tunable filter 118. The tunable filter 118 can allow module 100 to reject out of band signals or blockers that interfere with the desired signal, yet can permit reception of in band/wanted signals on the receive path 102. When the tunable filter 118 is tuned appropriately, the filter can reject out of band signals regardless of the band of operation or operating frequency(ies). This allows transmission of the signals in the desired spectrum on the transmit path 104 to be relatively free of unwanted noise as the tunable filters 116, 118, 106 and 110 can suppress the out of band spurious emission that can be created by the components in the transmit path 104 and the receive path 102.

Path switch 120 can dictate whether the module 100 will transmit or receive based on that status/position of the switch 120. When the module 100 is in a transmit configuration, the antenna, antenna array or reconfigurable antenna (RA) 122 can be connected via path switch 120 to the filters 106 and 118 and the tunable PA 112. When the module 100 is in a receive configuration, the RA 122 can be connected to filters 110 and 116 and to tunable low noise amp (LNA) 114. The RA 122 illustrated can also be tunable and can be efficient over a band of frequencies.

During a receive operation, the path switch 120 can connect signals being received by the antenna array 112 to the tunable LNA 114. This would allow the tunable LNA 114 to be matched to the external load provided by the RA 122, regardless of operating frequency. Proper tuning allows the module 100 to achieve the appropriate gain, noise figure, and linearity performance irrespective of the operating frequency.

In one embodiment, all of the active and passive components such as the tunable LNA 114, tunable PA 112, path switch 120 and filters 106, 118, 110 and 116 can be integrated on a single semiconductor die, to achieve cost reductions. Such cost reductions can be achieved in the processing, manufacturing and test of the die/module 100. Thus, the module can be packaged in a small low cost package. The module 100 could also be implemented as part of a system on a chip (SoC) to conserve motherboard area.

As mentioned above, the module 100 can communicate with other network compatible devices utilizing many different standards/protocols such as WiFi, WiMax, 3G, LTE, and Cellular. The coupled network devices can request the module 100 to change to different modes. Such modes can require operation at different frequencies. To control the frequency of operation, a digital control signal or a series of digital control signals can be originated by the baseband module 108 (that receives such a network communication for a mode change) responsive to a characteristic of a received signal from a coupled network device. The control signals from the baseband module 108 can be received by control circuitry 124 and control circuitry can provide the appropriate control signals to the tunable PA, 112, tunable LNA 114 and the filters 106, 110, 116, and 118. This digital control include a fine tuning module that can "fine tune" the impedance/frequency characteristics of the tunable PA 112, tunable LNA 114, filters 106, 118, 110 and 116 and can even the transmit/receive paths 104 and 102.

As stated above, the front end module 100 can operate in accordance with many different standards referred to herein as operating in different modes such as WiFI, WiMax and 3G LTE. Thus, a single signal input to control module 124 can be modified by the control module 124 utilizing combinational logic and the control module 124 can provide an individually tailored signal to each filter 106, 110, 116, and 118, the tunable LNA 114 and the tunable PA 112 to configure these components for a particular mode. Accordingly, the combinational logic of the control module 124 can ensure that all components are operating in the same mode.

Such controlled tuning can modify the front end module frequency response and other key characteristics of components in the transmit path 104 and the receive path 102 by switching or coupling reactive components such as inductors and capacitors 130, 132, 134 and 136 (referred to herein as tuning devices 130-136) into and out of these paths (i.e. 102, 104) or connecting and disconnecting tuning devices 130-136 to and from components of paths 102 and 104.

In one embodiment, changes in tuning can be accomplished by altering the direct current (DC) bias, bias voltage and other supply parameters provided to the tunable LNA 114 and tunable PA 112 to tune the operation of the tunable LNA 114 and tunable PA 112. Likewise, if the tuning devices 130-136 are active components the bias point and supply conditions of an active tuning device 130-136 could be altered to tune the module 100. In another embodiment, tuning devices 130-136 can be switched in and out of the system by coupling and decoupling the devices 130-136 with transistors (not shown). Achieving the appropriate bias points and impedance matching can improve various performance parameters such as noise factor (NF), gain, linearity, out of band noise rejection, and PAE.

Some modes require different power levels. In one embodiment, the output power of the module 100 can fluctuate between one milli-watt and four watts depending on the selected mode. Thus, module 100 can have a transmit power that is greater than nine tenths of a milli-watt and less that four point one watt. Such a power level can be achieved by different biasing configurations. Tuning can be implemented at the system level, the path level or at component level where the tuning device 130-136 is integrated within an active component such as the tunable PA 112 and the tunable LNA 114.

Thus, variations in frequency response can be achieved by switching active or passive tuning devices 130-136 in and out of the system at predetermined locations. Although tuning devices 130-136 are only illustrated on the transmit path 104 they would also be implement on the receive path 102 and throughout the entire module and even external to the module for example at the antenna, RA 122. The switching can occur in response to the mode selected by the control module 125 and, in addition, when fine tuning is being performed as controlled by fine tuning module 127. Thus, fine tuning module can achieve improved performance in a selected mode. For example, the control module 125 can make a change by connecting or disconnecting a tuning device 130-136 to a component of the paths 102 and 104, then, the fine tuning module 127 in the control module 124 can receive at least one performance indicator from the monitor 125.

Performance indicators such as voltage standing wave ratio (VSWR), noise figure, data errors, reflection parameters, power delivered to the RA 122, power received from the RA 122, interferer/blocker parameters and other parameters can be utilized by the fine tuning module 127 to determine if a tuning change has improved or degraded system performance. In this adaptive mode, the fine tuning module 127 can continually strive for improved performance. The adaptive process could be part of a self test/set up procedure, a periodic self test, or it could be performed continually during "normal" operation.

In another embodiment monitor 125 can detect interference possibly caused by congestion due to multiple devices transmitting and receiving on the same channel or frequency, or in the same mode. In this embodiment, the monitor 125 or the based band module 108 can suggest a mode change based on the detected interference. Thus the module 100 and other network devices in communication with the module 100 can switch to a mode/frequency with less interference. Thus, the mode can be changed to a protocol and a frequency that has minimal traffic and will provide better performance than the congested channels/modes. In yet another embodiment, a user can, via a graphical user interface, manually configure the desired mode to be utilized by the system. The graphical user interface could also display the monitored performance parameters SNR data error rates etc. to assist the user in selecting an improved mode.

In accordance with the present disclosure, the switching of devices 130-136 into and out of the system 100 based on the mode selected and performance based adjustments can be performed at any location in the system/module 100 with any suitable switching device. Thus, the locations of tuning devices, type of tuning devices, and type of devices that switch the tuning devices in and out of the system disclosed herein are not to be construed as limiting the scope of this disclosure. In one configuration, the switching procedure can change the frequency response of the filters 106, 110, 116 and 118 such that the center frequency of the filters aligns with the appropriate standard.

An acceptable P1dB compression point can be provided by the transmission path 104 by actively loading the transmission path 104 by "pulling" the output impedance of the tunable power amplifier, hence changing the impedance presented to the external load such as RA 122. In one embodiment, the switching functions (connecting and disconnecting tuning elements and biasing) can be performed utilizing integrated "E_Mode Hemt" transistors or metallic oxide semiconductor field effect transistors (MOSFET) or micro-electro mechanical devices (MEMS) proximate to the tuning devices 130-136.

Generally, a single front end module 100 can effectively communicate utilizing the WiFi standard which operates at 2.4 and 5.2 GHz and the WiMax which operates at 3.5 GHz using a single hardware architecture. It can be appreciated that the module 100 utilizes a single LNA, PA, four filters and two baluns wherein a traditional front end module that accommodates these standards will utilize three PA's three LNA's, six filters and three baluns. The single LNA, PA and four filters illustrated result in improved reliability, lower costs and significant power and size savings when compared to traditional designs.

In addition a much smaller and less complex set of antenna switches are required with the reduced number of RF paths again resulting in a smaller more efficient system. Such a reduced component count can provide a reduced insertion loss at the front end, better power efficiency on the transmit path 104 and better sensitivity on the receive path 102.

The disclosed module can be manufactured utilizing a multitude of materials and process technologies. Namely, gallium arsenide (GaAs) technology, silicon germanium (SiGe) technology, complementary metal oxide semiconductor (CMOS) technology and Indium Phosphide, (InP) technology and other process technologies can provide improved performance over traditional transistors. In addition, GaAs E_Hemt can be utilized for the LNA and GaAs D_Hemt can be utilized for the antenna switches. Passive components such as the filters and baluns can be implanted on a "carriere" substrate made of low temperature co-fired ceramic (LTCC) or organic material. However all components, including the filters, baluns and other passive components can be integrated on a single semiconductor die. In the disclosed module 100, all or nearly all of the components can be integrated onto a single E_HEMT Die, hence achieving a highest or higher level of integration, avoiding die to die interconnections and their resultant extra production/test cost and yield issues and their impedance mismatch and problems.

The disclosed system can operate utilizing only one antenna where the tradition system utilizes at least three antennas again reducing the cost and form factor of the disclosed system. The disclosed module provides a smaller package and smaller pin count than conventional architectures, again resulting in reduced cost and form factor. Thus, the system can utilize a single transmit and a single receive path to support multiple standards. At a process technology level system partitioning can be accomplished and the universal front end module 100 can be placed on a single integrated circuit such that no external components are required. For example, the universal front end module can be integrated on a simple quad flat pack with no leads (QFN) type RF package.

Figure 2:
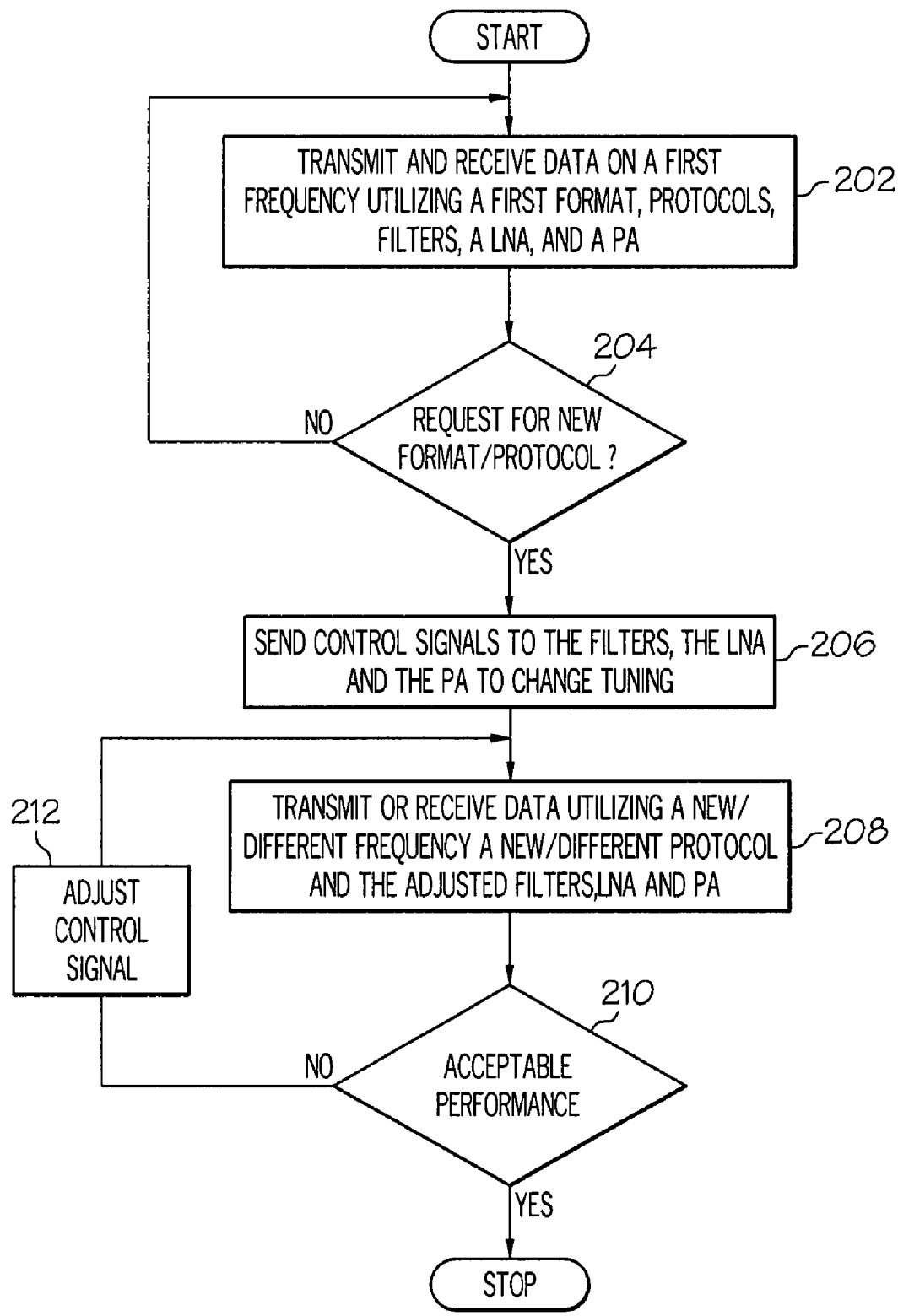
FIG. 2 is a flow diagram of operating a universal front end module.

Referring to FIG. 2 a flow diagram of a method for operating a device with a universal front end module is disclosed. As illustrated by block 202, a front end module can transmit and receive data on a first frequency utilizing a first protocol. The front end module can have a single transmit path and a single receive path with at least one tunable filter on each path, a tunable LNA on the receive path and a tunable PA on the transmit path. In one embodiment, the first protocol can be in accordance with WiFI, WiMax and 3G LTE standards.

As illustrated by block 204, it can be determined if signals are received that contain a request to change from the existing format/protocol to a new format protocol. The control signals can be sent from a coupled network device, received and processed by a baseband portion of the device or other portions and in one embodiment the base band portion can generate and send mode change signals to the control module. The control module can manipulated and disperse the control signals to the appropriate components in the system. The adaptive control module can be implemented as a processor or as combinational logic. As illustrated by block 206, the controls signals can be sent to tuning elements of the PA, LNA, filters and possibly to tuning elements connected to the transmission path and reception path such that the paths can operate efficiently at the new frequency/with the new protocol defined by the new mode.

As illustrated by block 208, the device can transmit and receive utilizing this new/different protocol with the adjusted filters, LNA and PA. At decision block 210 it can be determined if the front end is performing acceptably and if it is, the process can end. If the front end is not performing to an acceptable predetermined metric, then the control signals can be adjusted at block 212 in an attempt to improve operating performance.

Each process disclosed herein can be implemented with a software program. The software programs described herein may be operated on any type of computer, such as personal computer, server, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the present disclosure, represent embodiments of the present disclosure.

The disclosed embodiments can take the form of an entirely hardware embodiment, an entirely software embodiment or an embodiment containing both hardware and software elements. In one embodiment, the arrangements can be implemented in software, which includes but is not limited to firmware, resident software, microcode, etc. Furthermore, the disclosure can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The control module can retrieve instructions from an electronic storage medium. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present disclosure contemplates methods, systems, and media that provide a universal front end. It is understood that the form of the arrangements shown and described in the detailed description and the drawings are to be taken merely as examples. It is intended that the following claims be interpreted broadly to embrace all the variations of the example embodiments disclosed.

What is claimed is:

1. An apparatus comprising:
   a mode controller configured to switch tuning devices at predetermined locations in the apparatus to enable communication at a predetermined frequency, and the mode controller changes modes in response to a detection of interference;
   a first tunable filter on a transmit path to receive a mode control signal from the mode controller, to receive a signal to be transmitted and to provide a filtered output signal responsive to the mode control signal and the signal to be transmitted, the mode control signal associated with a predetermined local area network protocol having the predetermined frequency;
   a tunable power amplifier on the transmit path, to receive a mode control signal from the mode controller, to receive the filtered output signal and to provide an amplified signal suitable for a wireless transmission; and
   a second tunable filter on the transmit path to receive a mode control signal from the mode controller and the amplified signal and to produce a transmittable signal, where a single transmit path can be utilized to transmit the transmittable signal in at least two different modes responsive to the mode controller.

2. The apparatus of claim 1, wherein the mode controller changes modes in response to a request from a network coupled apparatus and wherein the modes have a transmit power that is greater than nine tenths of a milli-watt and less than four point 1 watts.

3. The apparatus of claim 1, further comprising:
   a third tunable filter to receive a mode control signal from the mode controller and to receive a received signal and to provide a filtered received signal responsive to the mode control signal;
   a tunable low noise amplifier to receive a mode control signal from the mode controller and
   the filtered receive signal and to provide an amplified receive signal; and
   a fourth tunable filter to receive a mode control signal and the amplified receive signal and to produce a second filtered output signal wherein the receive signal has a frequency and a protocol that is associated with the mode control signal.

4. The apparatus of claim 1, wherein the predetermined protocol and a predetermined frequency is compliant with one of a WiMax, a WiFi, a 3GLTE or a cellular standard.

5. The apparatus of claim 1, further comprising a first balun to receive a differential transmittable signal from a baseband module and provide a single ended transmittable signal to the first filter.

6. The apparatus of claim 1, further comprising a second balun to receive a single ended receive signal and to create a differential signal in response to the single ended signal and to provide the differential signal to a baseband module.

7. The apparatus of claim 1, further comprising a fine tuning module to fine tune the system in the first mode and the second mode.

8. The apparatus of claim 7, further comprising a monitor to monitor system parameters and to send a system performance signal to the tuning module wherein the tuning module tunes the apparatus based on the monitored system performance.

9. A method comprising:
   transmitting a signal on a physical transmission path utilizing a first mode, the signal traveling over a wireless network to a first networked device, the first mode having a first frequency and a first protocol;

receiving a signal from the first networked device over the wireless network on a receive path utilizing the first mode;

reconfiguring a tuning of components in the transmission path and the receive path based on a mode change signal requesting a change from the first mode to a second mode due to detection of interference using the first mode;

transmitting a signal over the wireless network utilizing the second mode on the transmission path; and receiving a signal in the second mode over the wireless network on the receive path where the second mode, has a second frequency and a second protocol, where the first frequency is different than the second frequency and the first protocol is different than the second protocol.

10. The method of claim 9, further comprising receiving a mode select communication and configuring a mode based on the mode select configuration.

11. The method of claim 9, further comprising receiving a mode select transmission and creating a first tuning control signal for a low noise amplifier, a second tuning control signal for a power amplifier and a third tuning control signal for a filter.

12. The method of claim 9, wherein the first mode and the second mode comply with one of a WiMax, a WiFi, a 3GLTE and a cellular standard.

13. The method of claim 9, further comprising converting the received signal in the first mode and in the second mode to a differential signal.

14. The method of claim 9 further comprising converting a signal to be transmitted from a differential signal to a single ended signal.

\* \* \* \* \*